United States Patent
Blischak et al.

(10) Patent No.: US 6,547,222 B2
(45) Date of Patent: Apr. 15, 2003

(54) PACKING ELEMENT

(75) Inventors: David M. Blischak, Akron, OH (US); Paul I. Rufener, Rittman, OH (US); Phillip J. Herman, Uniontown, OH (US)

(73) Assignee: Koch Knight, LLC, Wichita, KS (US)

(*) Notice: Subject to any disclaimer, the term of this patent is extended or adjusted under 35 U.S.C. 154(b) by 0 days.

(21) Appl. No.: 09/784,524

(22) Filed: Feb. 15, 2001

(65) Prior Publication Data

US 2001/0033034 A1 Oct. 25, 2001

Related U.S. Application Data

(63) Continuation-in-part of application No. 09/418,082, filed on Oct. 14, 1999, now abandoned.
(60) Provisional application No. 60/149,384, filed on Aug. 17, 1999.

(51) Int. Cl.[7] .......................... B01J 19/30; B01D 47/14; F28D 17/00
(52) U.S. Cl. ................. 261/94; 261/DIG. 72; 96/290; 165/10; 165/909; 165/DIG. 42
(58) Field of Search .............................. 261/94, 95, 96, 261/97, 98, DIG. 72; 96/290, 291, 292, 293, 294, 295; 210/150, 151; 165/10, 909, DIG. 42

(56) References Cited

U.S. PATENT DOCUMENTS

| | | | |
|---|---|---|---|
| 578,548 A | 3/1897 | Deruelle | |
| 912,310 A | 2/1909 | Guttmann | |
| 1,360,928 A | 11/1920 | Goodwin | |
| 1,796,501 A | * 3/1931 | Berl | 261/94 |
| 2,172,714 A | 9/1939 | Schack et al. | |
| 2,602,651 A | * 7/1952 | Cannon | 261/DIG. 72 |
| 2,639,909 A | * 5/1953 | Leva | 261/DIG. 72 |
| 3,484,513 A | 12/1969 | Paoli | |
| 4,086,307 A | * 4/1978 | Glaspie | 261/97 |
| 4,155,960 A | 5/1979 | Gerdes et al. | |
| 4,277,425 A | 7/1981 | Leva | |
| 4,333,893 A | 6/1982 | Clyde | |
| 4,463,799 A | * 8/1984 | Takahashi et al. | 165/10 |
| 4,509,584 A | * 4/1985 | Michalak et al. | 165/10 |
| 4,575,435 A | 3/1986 | Kuhl | |
| 4,807,695 A | * 2/1989 | Ward | 165/10 |
| 5,304,423 A | 4/1994 | Niknafs et al. | |
| 5,525,270 A | 6/1996 | Bhaga et al. | |
| 5,747,143 A | * 5/1998 | Niknafs | 261/94 |

* cited by examiner

Primary Examiner—Duane Smith
Assistant Examiner—Jason M. Greene
(74) Attorney, Agent, or Firm—Shook, Hardy & Bacon, L.L.P.

(57) ABSTRACT

A packing element is provided for use in a mass transfer tower or a heat sink. The packing element is in the form of a saddle shaped member having a configuration generally corresponding to a portion of a toroid generated by rotating a plane closed curve about an axis that is coplanar with and spaced from the curve. The curve has inner and outer surface generating segments. The inner segment is closer to the axis than the outer segment. The outer segment is essentially w-shaped. The member has respective inner and outer surface portions which correspond in transverse cross-sectional shape to the shape of said segments. In one form of the invention, the inner segment is essentially w-shaped and complementary to said outer segment, whereby the element itself is essentially w-shaped in transverse cross-sectional configuration. In another form of the invention, the inner segment is essentially arcuate and convex relative to said axis, whereby the element itself is essentially ε-shaped in transverse cross-sectional configuration. In each of the forms of the invention, the element has shape that presents a pair of opposed end walls and an outer surface comprising a plurality of parallel, alternating ridges and grooves that extend between the end walls. In the first form of the invention, a plurality of holes pass through the ridges and grooves in a generally radial direction relative to the axis of the saddle shape. The holes facilitate drainage of liquid through a bed composed of a plurality of the elements arranged randomly on a tray of the tower.

21 Claims, 2 Drawing Sheets

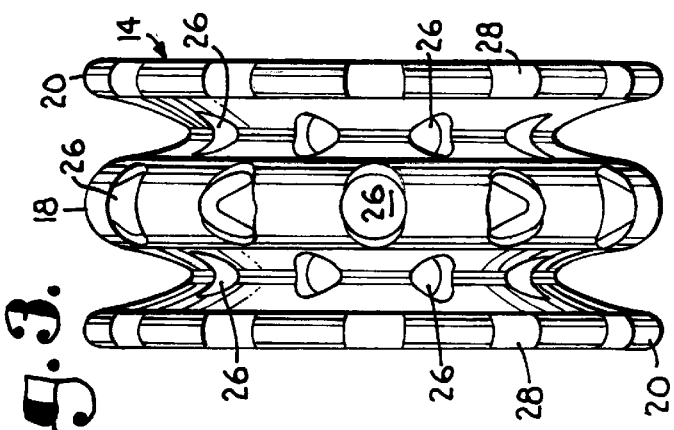
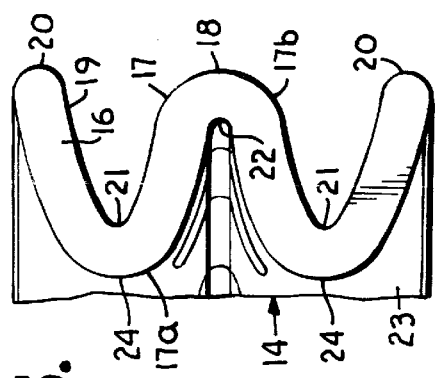
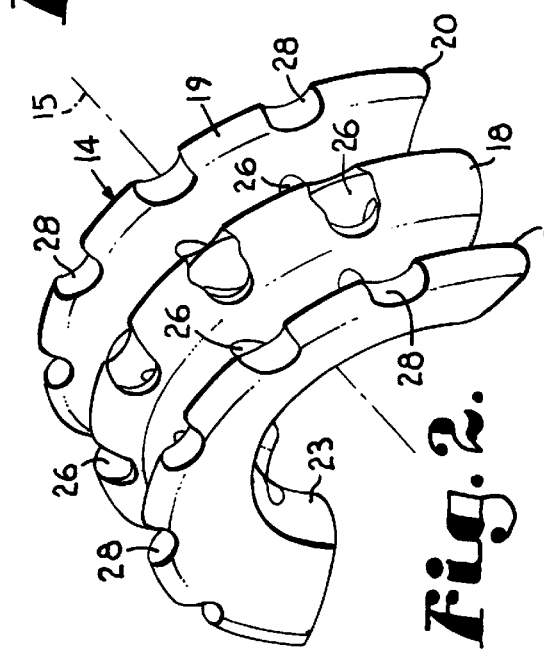
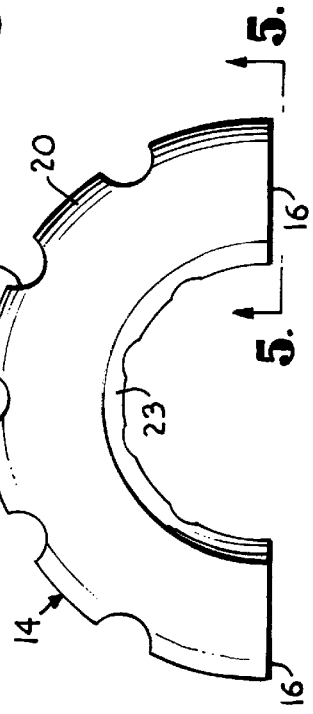
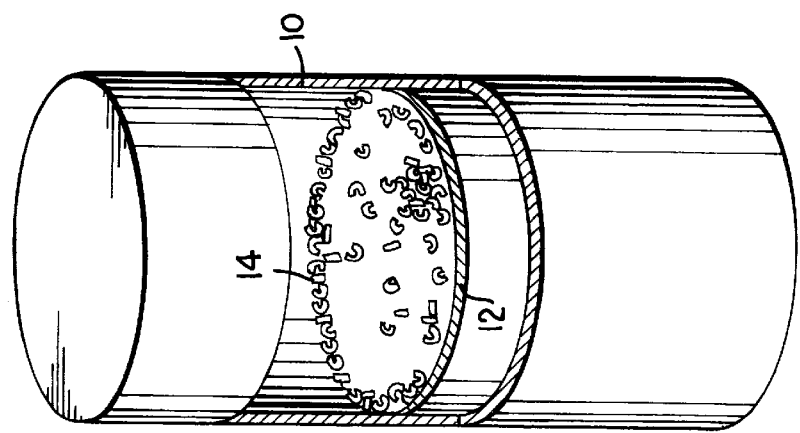

PACKING ELEMENT

CROSS-REFERENCE TO RELATED APPLICATIONS

This application is a continuation-in-part of prior application Ser. No. 09/418,082, filed Oct. 14, 1999, now abandoned, which in turn claims priority pursuant to 35 U.S.C §119(e) from provisional application serial No. 60/149,384, filed Aug. 17, 1999.

BACKGROUND OF THE INVENTION

1. Field of the Invention

The present invention relates generally to packing structures for chemical process equipment and, more particularly, to packing elements for use in randomly packed beds of mass transfer towers and in randomly packed beds for use in heat sink applications.

2. The State of the Prior Art

It is conventional to provide a mass transfer tower for use in transferring one or more components from one immiscible phase to another. Where the component is a chemical, it may be a gas component to be removed from a gas stream by absorption, or a component of a liquid mixture to be treated by a distillation or separation process. For such applications and a plurality of other applications involving mass transfer, it is conventional to pass the fluid to be treated through a column containing beds of randomly disposed packing elements. These elements are hereinafter referred to as packing elements.

It is known that the most efficient packing elements are those that present the largest surface area for contact by the fluids undergoing mass transfer. There have therefore been many attempts to design random packing elements with a maximum percentage of surface area. However, other characteristics are also desired. For example, it is important that the elements do not nest too closely together when in the randomly packed beds as this reduces the effective amount of surface area available for exposure to the fluid streams. It is also important that the elements do not pack so tightly together as to restrict the fluid flow, thus causing an increase in the pressure drop across the bed. Another concern, especially in the design and manufacture of ceramic elements, is that the maximization of surface area and the provision of proper drainage often comes at the cost of mechanical strength of the element. If the element fractures during installation or use in a bed, nesting may result.

Such packing elements, if constructed from suitable materials having appropriate heat absorption and retention characteristics, may also be useful in heat sink applications.

SUMMARY OF THE INVENTION

The present invention provides an improved packing element typically used in the chemical process industry in various operations where a gas stream is brought into contact with a liquid stream. Multiple packing elements are installed into a process vessel to create a packed bed. The unique shape of the packing elements of the invention was developed to provide minimum pressure drop across a packed bed while maximizing the available surface area for contacting liquid and gas streams. In accordance with the invention, the improved packing elements may also be used in connection with heat sink applications. Thus, a vessel, such as a column, chamber or tower, may be packed with a bed of the elements which is used to capture and retain heat from a first fluid medium and subsequently release the heat to a second fluid medium. As will be appreciated by those skilled in the art, the respective media may be a gas or a liquid. In particular, the elements of the invention may be used as a packing for a heat sink utilized in connection with a regenerative thermal oxidizer. Hot exhaust gases from the oxidizer is passed through a bed packed with the elements of the invention and the heat is transferred to the elements. Thereafter, a valve is switched and a relatively cooler fluid is caused to flow through the packed bed to pick up heat from the elements. The fluid heated in this manner may be an inlet fluid to be introduced into the oxidizer. In such application, only a single fluid traverses the packed bed at any given time; however, both surface area and low pressure drop remain important. It is to be noted in connection with the foregoing that heat sinks are well known applications which may also be used in a variety of industrial operations other than regenerative thermal oxidation.

In accordance with the concepts and principles of the invention, an improved packing element is provided for use in a mass transfer tower. Alternatively, the packing element of the invention may be use in heat sink applications as discussed above. The packing element comprises a saddle shaped member having a configuration generally corresponding to a portion of a toroid generated by rotating a plane closed curve about an axis that is coplanar with and spaced from the curve. Preferably the curve has inner and outer surface generating segments. The inner segment is located closer to the axis than the outer segment. Generally the outer segment may be essentially w-shaped. The member thus has respective inner and outer surface portions which correspond in transverse cross-sectional shape to the shape of such segments of the curve.

In one preferred form of the invention, the inner segment of the curve may also be essentially w-shaped and complementary to said outer segment, whereby the saddle shaped member has a w-shaped transverse cross-sectional configuration. In another preferred form of the invention, the inner segment of the curve may be essentially arcuate and convex relative to the axis, whereby the saddle shaped member has an $\epsilon$-shaped transverse cross-sectional configuration.

In accordance with the principles and concepts of the invention, the saddle shaped member may have a pair of opposed end walls and said outer surface portion may have a plurality of parallel, alternating ridges and grooves that extend between the end walls. In a more particular and specific form of the invention, both of the surface portions may have a plurality of parallel, alternating ridges and grooves that extend between the end walls. In one preferred form of the invention, the end walls may have a w-shaped configuration. In another preferred form of the invention, the end walls may have an $\epsilon$-shaped configuration.

In one preferred form of the invention, the saddle shaped member may have a plurality of holes that pass through the ridges and grooves in a generally radial direction relative to said axis. In addition, the saddle shaped member may be provided with a plurality of notches formed in the ridges, which notches extend in a direction generally parallel to the axis. Preferably the element may be formed of a ceramic material.

In accordance with the concepts and principles of the invention, a method of constructing a packed bed for a mass transfer tower is provided. The method may comprise the steps of providing a plurality of packing elements as described above and installing the same on a support tray of the mass transfer tower. The invention also provides a method of constructing a packed bed for use as a heat sink.

In accordance with this aspect of the invention, the method may comprise the steps of providing a plurality of packing elements as described above and installing the same on a support tray of a heat sink vessel. Preferably, in either case, the packing elements may be installed in a random orientation relative to one another.

The invention also provides a method for mass transfer comprising passing mass transfer fluids through a mass transfer tower packed with the improved elements of the invention. Furthermore, the invention may also provide a method for transferring heat from one fluid to another fluid comprising passing a relatively warmer fluid through a bed packed with the elements of the invention and subsequently passing a relatively cooler fluid through the same bed.

BRIEF DESCRIPTION OF THE DRAWINGS

The present invention is described in detail below with reference to the attached drawings, wherein:

FIG. 1 is a perspective view of a mass transfer tower including a bed of packing elements constructed in accordance with the principles and concepts of the present invention;

FIG. 2 is a perspective view of one embodiment of a packing element constructed in accordance with the invention;

FIG. 3 is a top plan view of the packing element of FIG. 2;

FIG. 4 is a side elevational view of the element of FIG. 2;

FIG. 5 is an end view of the element of FIG. 2 taken along line 5—5 of FIG. 4;

DETAILED DESCRIPTION OF THE INVENTION

Figure 6:
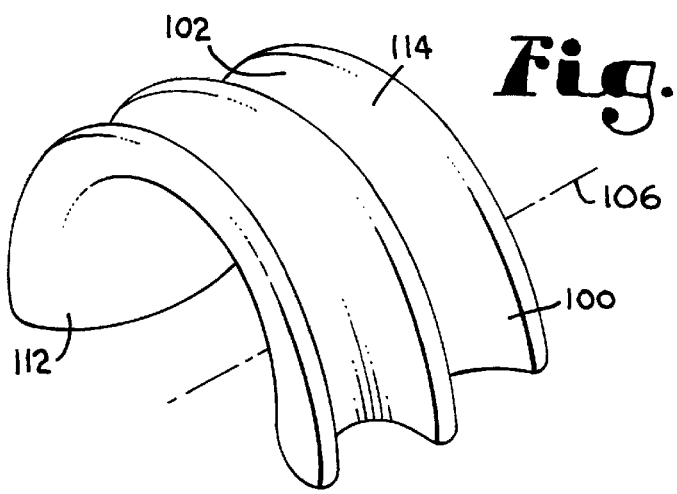
FIG. 6 is a perspective view of another embodiment of a packing element constructed in accordance with the invention.
Figure 7:
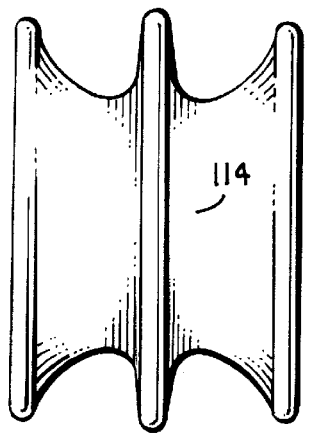
FIG. 7 is a top plan view of the packing element of FIG. 6.

A chemical treatment tower is illustrated in FIG. 1, and broadly includes a perimeter wall 10 presenting an open interior space into which liquids and vapors are conducted in counterflow relationship relative to one another. The view is fragmented to illustrate the general operation of the packing elements described herein, and to illustrate a supporting device or tray 12 onto which a multiplicity of packing elements 14 are installed to form a packed bed. The elements 14 are installed on the tray randomly by merely dumping them in place and roughly leveling the distribution by any suitable method. Thereafter, during operation of the tower, vapors and liquids are introduced into the tower from above and below the bed, and flow in a counterflow directions relative to one another so that they mix together in a manner contemplated by the utilization of the bed and the particular chemical process involved. Specifically, during operation, liquid flows over the outer surfaces of the packing elements while vapor engages the surfaces in accordance with the particular process.

As mentioned above, the invention also contemplates the use of the packing elements 14 as a heat sink, particularly a heat sink for a regenerative thermal oxidizer. In such an application generally involves only gas flow in single direction; however, both surface area and pressure drop remain important. The heat sink vessel may be constructed similarly to the tower, of FIG. 1. In this case, hot exhaust gas (generally air) from the oxidizer may be passed either upwardly or downwardly through the bed of packing elements whereby heat from the hot exhaust gas is transferred to and retained by the elements. After a predetermined and/or optimal amount of heat has been captured by the elements, one or more valves are switched whereby cooler inlet air is passed through the bed of elements. Hence, heat retained by the elements is transferred to the inlet air. The inlet air is thus heated prior to combustion in the oxidizer whereby the overall fuel efficiency of the oxidizer may be enhanced. It will be clear to the routineer in the chemical processing art that use of a heat sink in connection with a regenerative thermal oxidizer is simply a single example of the use of such a heat sink and that heat sinks made up of the novel elements of the invention may be used similarly in any one of a very large number of individual applications where it is desirable to transfer heat from one fluid to another.

A single packing element 14 constructed in accordance with one preferred embodiment of the present invention is illustrated in FIGS. 2 through 5. The element 14 may preferably be formed of a ceramic material, and broadly comprises a saddle shape defined by a segment of a toroid generated by rotating a generally w-shaped curve about an axis 15 (FIG. 2) of the saddle shape that is coplanar with and spaced from the curve. Another way of describing the shape of the element 14 is that of a segment of a hollow torus that has a fold creating a "w" shaped cross section perpendicular to the rotation of the torus.

The resulting shape of the element 14 presents a pair of opposed end walls 16, shown in FIG. 5, and a plurality of parallel, alternating ridges and grooves that extend between the end walls. The end walls 16 are preferably generally planer, and the segment of the toroid forming the element is preferably one half of a complete toroid such that the end walls are disposed in a common plane, as shown in FIG. 4. The curve mentioned in the foregoing paragraph, which is identified in the drawings by the reference numeral 17, has essentially the same shape as the end wall 16 illustrated in FIG. 5, where it can also be seen that both the inner segment 17a and the outer segment 17b of the curve 17 are each essentially w-shaped and complementary to one another. Thus, the saddle shaped element 14 has a w-shaped transverse cross-sectional configuration.

Returning to FIG. 5, the ridges and grooves of the element 14 are substantially similar in shape such that the element has an essentially corrugated configuration in which the radially outer surface 19 of the element includes a central ridge 18, a pair of grooves 21 and a pair of edge ridges 20, and the radially inner surface 23 of the element 14 includes a central groove 22 and a pair of ridges 24 spaced an equal distance on either side of the central groove 22.

The provision of the w-shaped configuration of the element provides several advantages over conventional ceramic constructions. For example, by forming a saddle shaped element with a w-shaped sectional profile, a construction results in which a plurality of the elements can be randomly installed in the bed of a tower to provide minimum pressure drop during a mass transfer operation while maximizing the available surface area for contact of liquid and vapor. In addition, the construction achieves these objects without sacrificing the strength of the element. As such, the element performs well in a randomly packed bed, providing mass transfer with relatively little pressure drop vertically across the bed. In addition, the strength is such that the element is not easily broken during use.

Turning to FIG. 3, a plurality of radially extending holes 26 pass through the element and are spaced circumferentially from one another along the lengths of the central outer ridge 18 and each of the inner ridges 24. The holes 26 are provided to facilitate drainage of liquid through a bed composed of a plurality of the elements arranged randomly on the tray of the tower. In addition, the holes permit vapor to pass upward through the element, improving operation of the bed and reducing the pressure drop that occurs during operation. The holes 26 are sized to provide drainage and the passage of gas without substantially adversely affecting the mechanical strength of the element. If the holes are too small, drainage and vapor passage are impeded, increasing the pressure drop across the bed. If the holes are too large, the element becomes weakened in the region of the holes, increasing the likelihood that the element will break during use.

As illustrated in FIG. 2, a plurality of notches 28 are formed in the edge ridges of the element. The notches 28 extend in a direction generally parallel to the axis of the saddle shape and are preferably aligned with the holes 26 in the central ridge 18 in the circumferential direction of the element 14. The notches 28 define drip points along the edge ridges 20 so that liquid can drain from the element, and also define passages along which vapor can travel up through the bed. The notches preferably include a curved surface defined by a diameter substantially equal to the diameter of the holes in the central ridge of the outer surface. However, other notch shapes could possibly be employed.

Another embodiment of a packing element constructed in accordance with the concepts and principles of the invention is illustrated in FIGS. 6 through 9, where the element is identified by the reference numeral 100. Like the element 14, the element 100 may preferably be formed of a ceramic material, and broadly comprises a saddle shaped member 102 defined by a segment of a toroid generated by rotating a generally ε-shaped curve about an axis that is coplanar with and spaced from the curve. The curve in this case can be seen in FIG. 9 where it is identified by the reference numeral 104 and the axis is identified in FIG. 6 by the reference numeral 106. Another way of describing the shape of packing element 100 is that it has a configuration generally corresponding to a portion of a toroid generated by rotating the plane closed curve 104 about axis 106. The curve 104 has inner and outer surface generating segments 108 and 110 and the inner segment 108 is closer to the axis 106 than the outer segment 108. The outer segment 110 is essentially w-shaped whereas the inner surface 108 is essentially arcuate and convex relative to axis 106. As can be see viewing FIGS. 6 through 9, the saddle shaped member 100 has respective inner and outer surface portions 112 and 114 which respectively correspond in transverse cross-sectional shape to the shapes of the segments 106, 108 of the surface generating curve 104.

Figure 8:
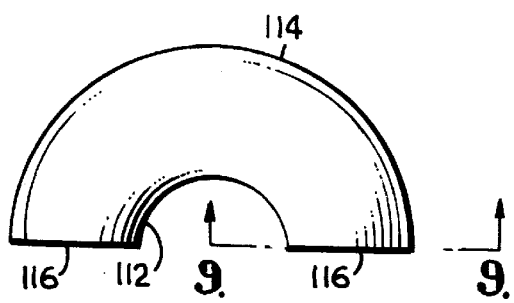
FIG. 8 is a side elevational view of the element of FIG. 6.
Figure 9:
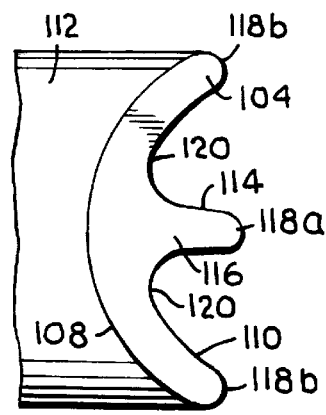
FIG. 9 is an end view of the element of FIG. 6 taken along line 9—9 of FIG. 8.

The resulting shape of the element 100 presents a pair of opposed end walls 116, shown in FIG. 9. These walls are configured generally in the shape of an ε (epsilon) or anchor as can be seen. The generally w-shaped outer surface portion 114 has a plurality of parallel, alternating ridges 118 and grooves 120 that extend between the end walls 116. The end walls 116 are generally planer, and the segment of the toroid forming the element 100 is preferably one half of a complete toroid such that the end walls 116 are disposed in a common plane, as shown in FIG. 8.

With further reference to FIG. 9, it can be seen that surface portion 114 includes a central ridge 118a and a pair of edge ridges 118b. The central ridge 118a extends outwardly beyond the edge ridges 118b. The grooves 120 are presented between the edge ridges 118b and the central ridge 118a. The grooves 120 have a height and a transverse width, with the transverse width being greater than the height. The inner surface portion 112 has an arcuate shape which also extends around axis 106 between the end walls 116. Moreover, in a transverse direction relative to the element 100, inner surface portion 112 is essentially arcuate and convex relative to axis 106.

The provision of the ε-shaped configuration of the element provides several advantages over conventional ceramic constructions. For example, by forming a saddle shaped element with an ε-shaped sectional profile, a construction results in which a plurality of the elements can be randomly installed in the bed of a tower to provide minimum pressure drop during a mass transfer operation while maximizing the available surface area for contact of liquid and vapor. In addition, the construction achieves these objects without sacrificing the strength of the element. As such, the element performs well in a randomly packed bed, providing mass transfer with relatively little pressure drop vertically across the bed. In addition, the strength is such that the element is not easily broken during use.

By constructing the element in accordance with the present invention, numerous advantages are achieved. For example, by constructing the element in the shape of a saddle having parallel, alternating ridges extending along the length of the outer surfaces, a packed bed can be formed of the elements for use in a chemical process tower or the like to minimize the pressure drop across the bed while maximizing the available surface area for contact of liquid and gas. When alternating ridges extending along the length of the inner surfaces are also provided, optimum results are achieved in some applications. In addition, the placement of the holes in the element may facilitate drainage of liquid from a bed formed of the elements, minimizing pooling of the liquid in some applications; however, holes are not a critical feature of the invention. For example, holes and grooves are not necessary for achieving excellent results with the embodiment of FIGS. 6 through 9. In this latter regard it is to be noted that the element 14 may preferably be somewhat larger than the element 100, although this is not an essential feature of the invention. For example, element 14 may have a width dimension of 2.5 to 3 inches or so between the edge ridges 20 and a radius of approximately 3 inches or so from the axis 15 to the outer surface at the apexes of the ridges 18 and 20. On the other hand, element 100 may have a width dimension of 1 to 1.125 inches or so between the edge ridges 118b and a radius of approximately 0.75 inch or so from the axis 106 to the outer surface at the apexes of the ridges 118a and 118b.

As set forth above, in one of its preferred forms, the packing element of the present invention may have a general shape that is a segment of a hollow torus having a fold creating a "w" shaped transverse cross-sectional configuration. Preferably, several holes are located throughout the packing element. The unique "w" shaped cross-section limits nesting of the individual elements when installed as a packed bed. The holes are provided through the element and define flow paths for both gas and liquid. The location of the holes also allows for complete drainage of the packed bed. In another preferred form of the invention as described above, the packing element has an ε-shaped transverse cross-sectional configuration which also limits nesting of the individual elements when installed as a packed bed.

By providing a packing element in accordance with the present invention, several advantages are realized. For example, by providing elements having a shape in accordance with the invention, a construction results in which a user has the ability to reduce the size of the packed bed and/or reduce the energy costs to move a process gas through the packed bed. As set forth above, the packing element may be designed as a ceramic element. However, the packing element of the invention can alternately be manufactured in the desired shape from a variety of materials including metals, plastics and ceramics in order to meet the needs of various process chemistries.

As discussed above, the elements of the invention are useful in connection with both mass transfer operations and heat sink operations. Generally speaking, the ε-shaped element may be preferred for heat sink applications because of its overall simplicity. However, it is conceivable that the w-shaped element may also find use in connection with such an application.

Although the present invention has been described with reference to the preferred embodiments illustrated in the drawings, it is to be noted by those of ordinary skill in the art that substitutions may be made and equivalents employed herein without departing from the scope of the invention as recited in the claims.

We claim:

1. A packing element for use in a mass transfer tower or a heat sink, said packing element comprising a saddle shaped member having a configuration generally corresponding to a portion of a toroid generated by rotating a plane closed curve about an axis that is coplanar with and spaced from the curve, said curve having inner and outer surface generating segments, said inner segment being closer to said axis than said outer segment, said outer segment being essentially w-shaped and said inner segment is essentially arcuate and convex relative to said axis, whereby said member has respective inner and outer surface portions which correspond in transverse cross-sectional shape to the shape of said segments and a pair of opposed planar end walls, said outer surface portion presenting a plurality of parallel, alternating ridges and grooves that extend between the ends walls, wherein said ridges comprise a pair of edge ridges and an intermediate ridge positioned between the edge ridges, said intermediate ridge extending outwardly at least as far as said edge ridges.

2. A packing element as set forth in claim 1, wherein the element is formed of a ceramic material.

3. A method of constructing a packed bed for a mass transfer tower comprising providing a plurality of packing elements as set forth in claim 1 and installing the same on a support tray of the mass transfer tower.

4. A method as set forth in claim 3, wherein the packing elements are installed in a random orientation relative to one another.

5. A packing element as set forth in claim 1, wherein said saddle shaped member is for use in a mass transfer tower.

6. A packing element as set forth in claim 1, wherein said saddle shaped member is for use in a heat sink.

7. A method of transferring mass between two fluids comprising providing a plurality of packing elements as set forth in claim 1, installing the elements on a support tray of the mass transfer tower and passing said fluids through the installed elements in countercurrent flow.

8. A method of transferring heat from a relatively warmer first fluid to a relatively cooler second fluid comprising providing a plurality of packing elements as set forth in claim 1, arranging the elements as a bed thereof in a heat sink vessel, passing said first fluid through said bed, and subsequently passing said second fluid through said bed.

9. A packing element as set forth in claim 1, wherein said end walls are disposed in a common plane.

10. A packing element as set forth in claim 1, wherein said intermediate ridge is centrally positioned between said edge ridges.

11. A packing element as set forth in claim 10, wherein said intermediate ridge extends outwardly beyond said edge ridges.

12. A packing element as set forth in claim 11, wherein said end walls are disposed in a common plane.

13. A packing element as set forth in claim 1, wherein said intermediate ridge extends outwardly beyond said edge ridges.

14. A packing element as set forth in claim 1, wherein said valleys have a height and a transverse width and wherein said width is greater than said height.

15. A packing element for use in a mass transfer tower or a heat sink, said packing element comprising a saddle shaped member having a configuration generally corresponding to a portion of a toroid generated by rotating a plane closed curve about an axis that is coplanar with and spaced from the curve, said curve having inner and outer surface generating segments, said inner segment being closer to said axis than said outer segment, said outer segment being essentially w-shaped and said inner segment is essentially arcuate and convex relative to said axis, whereby said member has respective inner and outer surface portions which correspond in transverse cross-sectional shape to the shape of said segments and a pair of opposed planar end walls, said outer surface portion presenting a plurality of parallel, alternating ridges and grooves that extend between the ends walls, wherein said ridges comprise a pair of edge ridges and an intermediate ridge positioned between the edge ridges.

16. A packing element as set forth in claim 15, wherein said end walls are disposed in a common plane.

17. A packing element as set forth in claim 16, wherein said intermediate ridge is centrally positioned between said edge ridges and extends outwardly beyond said edge ridges.

18. A packing element as set forth in claim 17, wherein said grooves have a height and a transverse width and wherein said transverse width is greater than said height.

19. A packing element as set forth in claim 15, wherein said intermediate ridge is centrally positioned between said edge ridges and extends outwardly beyond said edge ridges.

20. A packing element as set forth in claim 19, wherein said grooves have a height and a transverse width and wherein said transverse width is greater than said height.

21. A packing element as set forth in claim 15, wherein said grooves have a height and a transverse width and wherein said transverse width is greater than said height.

* * * * *